(12) United States Patent
Truong et al.

(10) Patent No.: US 10,754,747 B2
(45) Date of Patent: Aug. 25, 2020

(54) PHYSICAL PORT INFORMATION ASSOCIATED WITH SYSTEM IDENTIFIERS

(71) Applicant: Hewlett-Packard Development Company, L.P., Houston, TX (US)

(72) Inventors: Binh T. Truong, Houston, TX (US); Chi So, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/759,118

(22) PCT Filed: Sep. 25, 2015

(86) PCT No.: PCT/US2015/052348
§ 371 (c)(1),
(2) Date: Mar. 9, 2018

(87) PCT Pub. No.: WO2017/052620
PCT Pub. Date: Mar. 30, 2017

(65) Prior Publication Data
US 2018/0285229 A1 Oct. 4, 2018

(51) Int. Cl.
*G06F 11/30* (2006.01)
*G06F 13/10* (2006.01)
*G06F 11/32* (2006.01)

(52) U.S. Cl.
CPC ........ *G06F 11/3051* (2013.01); *G06F 11/321* (2013.01); *G06F 11/328* (2013.01); *G06F 13/102* (2013.01)

(58) Field of Classification Search
CPC ............... G06F 9/00; G06F 13/14; G06F 1/26
See application file for complete search history.

(56) References Cited

U.S. PATENT DOCUMENTS

| | | | |
|---|---|---|---|
| 6,076,160 A * | 6/2000 | Wisor | G06F 13/4217 710/104 |
| 6,216,183 B1 | 4/2001 | Rawlins | |
| 6,931,456 B2 | 8/2005 | Payne et al. | |
| 6,952,723 B1 * | 10/2005 | Laiho | G06F 16/9566 709/217 |
| 7,228,345 B2 | 6/2007 | Larson et al. | |
| 7,584,347 B2 | 9/2009 | El-Haj-mahmoud et al. | |

(Continued)

FOREIGN PATENT DOCUMENTS

EP 1764702 3/2007

OTHER PUBLICATIONS

Unknown, "Maintaining the Server", Cisco UCS C220 M4 Server Installation and Service Guide, Apr. 4, 2004, 27 pages.

*Primary Examiner* — Getente A Yimer
(74) *Attorney, Agent, or Firm* — HP Inc. Patent Department

(57) ABSTRACT

In one implementation, a system for providing a representation of a physical location of a port includes an identifier engine, a configuration engine, and a display engine. In an example, the identifier engine retrieves a value stored on a first memory resource located on a system board. In an example, a configuration engine identifies a memory resource location on a second memory resource that is to store physical port information using a system identifier associated with the value. In an example, a display engine causes the physical port information to be displayed.

20 Claims, 7 Drawing Sheets

(56) References Cited

U.S. PATENT DOCUMENTS

| | | | | |
|---|---|---|---|---|
| 8,054,832 | B1* | 11/2011 | Shukla | H04L 45/00 370/230 |
| 2003/0041189 | A1 | 2/2003 | Choi et al. | |
| 2007/0174528 | A1 | 7/2007 | Manyver | |
| 2008/0222407 | A1* | 9/2008 | Carpenter | G06F 21/575 713/2 |
| 2010/0088547 | A1* | 4/2010 | Chang | G06F 11/2284 714/36 |
| 2010/0146439 | A1* | 6/2010 | Ariga | G06F 16/951 715/810 |
| 2011/0012727 | A1 | 1/2011 | Pance et al. | |
| 2011/0289246 | A1 | 11/2011 | Nain et al. | |
| 2012/0303944 | A1* | 11/2012 | Peng | G06F 11/1433 713/2 |
| 2013/0138859 | A1* | 5/2013 | Vecera | G06F 13/102 710/305 |
| 2014/0156853 | A1* | 6/2014 | Suda | H04L 47/78 709/226 |
| 2014/0195697 | A1* | 7/2014 | Chen | G06F 13/385 710/10 |
| 2015/0039788 | A1 | 2/2015 | Dearing et al. | |
| 2015/0339128 | A1* | 11/2015 | Bookman | G06F 8/61 718/104 |

\* cited by examiner

PHYSICAL PORT INFORMATION ASSOCIATED WITH SYSTEM IDENTIFIERS

BACKGROUND

Compute devices connect to other compute devices to communicate (e.g., store data). For example, a desktop computer may connect to a peripheral device via a cable connected to a port on the desktop computer.

DETAILED DESCRIPTION

In the following description and figures, some example implementations of apparatus, systems, and/or processes for providing a representation of a physical location of a port are described. Compute devices may be configured with many ports including multiple ports for the same class or type of port. Ports of the same connection type may even be placed on different areas of the device. For example, a desktop computer may be designed with four universal serial bus (USB) ports on the back side of a chassis and four more USB ports on the front of the chassis for easier access. USB ports have become plentiful on systems because of adaptation of standard communication interfaces for peripherals. For example, there are a plenitude of peripheral devices that are available (and will be available) to plug into a compute device through standardized interfaces, such as USB. With so many devices connectable to a system, devices may utilize management processes by a user to remember the system's configuration and/or external device capabilities. In addition, USB devices are generally connected with location-agnostic capabilities to allow a device to be plugged into any available USB port. For example, it may be possible for a user to forget or otherwise not know what device is plugged into each port.

Various examples described below relate to providing a representation of a physical location of a port. By utilizing a system identifier associated with a specific system board, the number and configuration of the ports of a system may be loadable and retrievable from the system. For example, an image of the chassis that represents where the USB ports are located may be retrieved based on a system identifier, and the ports and device information can be displayed by a basic input output system (BIOS). In this manner as described further herein, a relationship between the digital information available about the device and the physical location of the port is manageable by the BIOS.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus.

Figure 1:
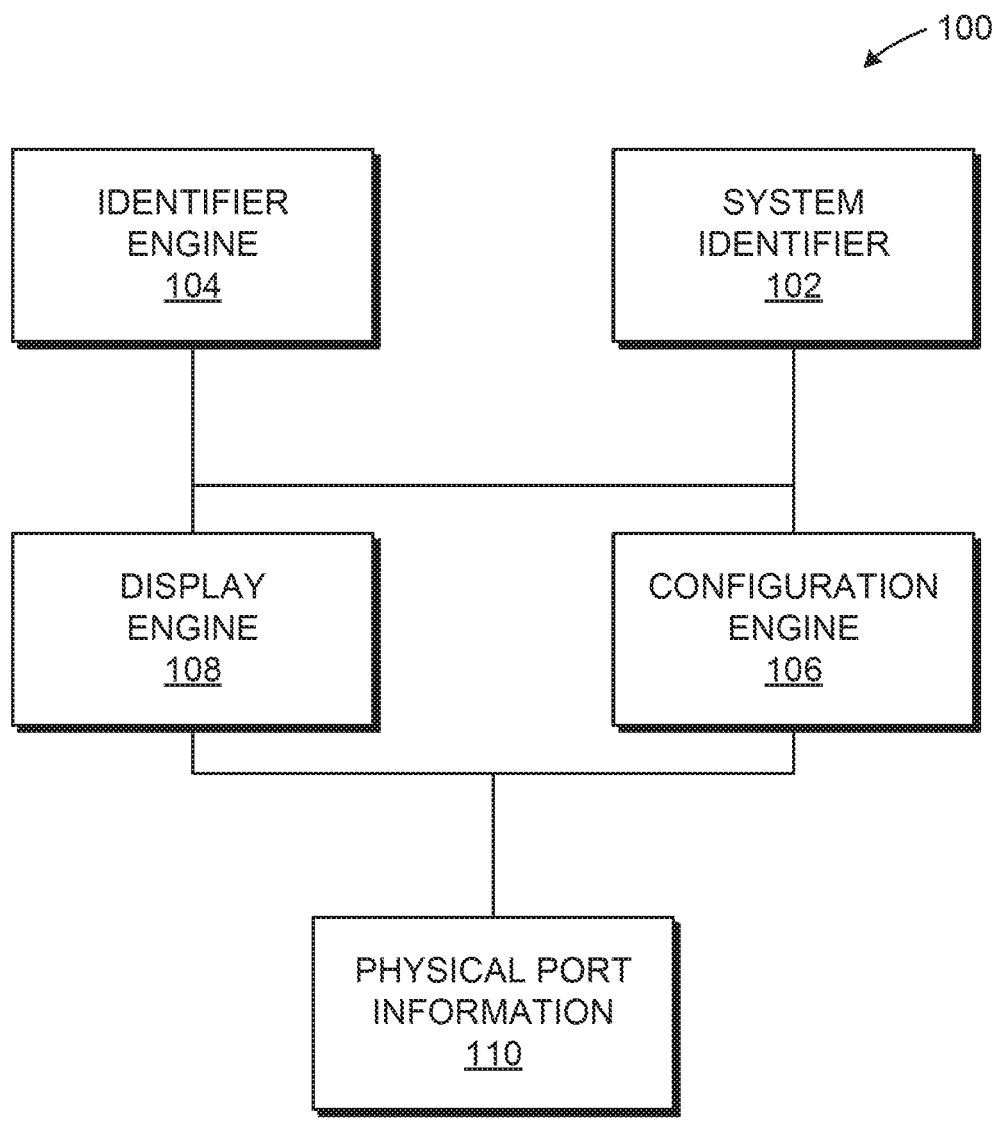
FIGS. 1, 2A, and 2B are block diagrams depicting example systems for providing a representation of a physical location of a port.
Figure 2A:
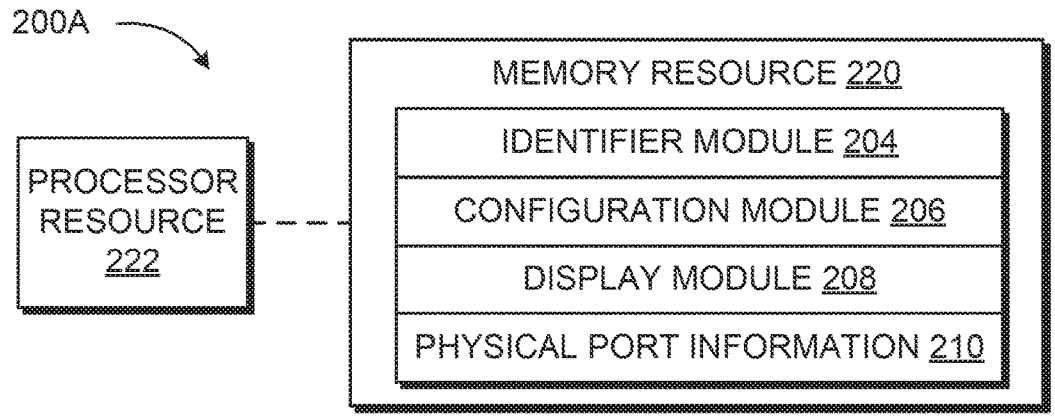
Figure 2B:
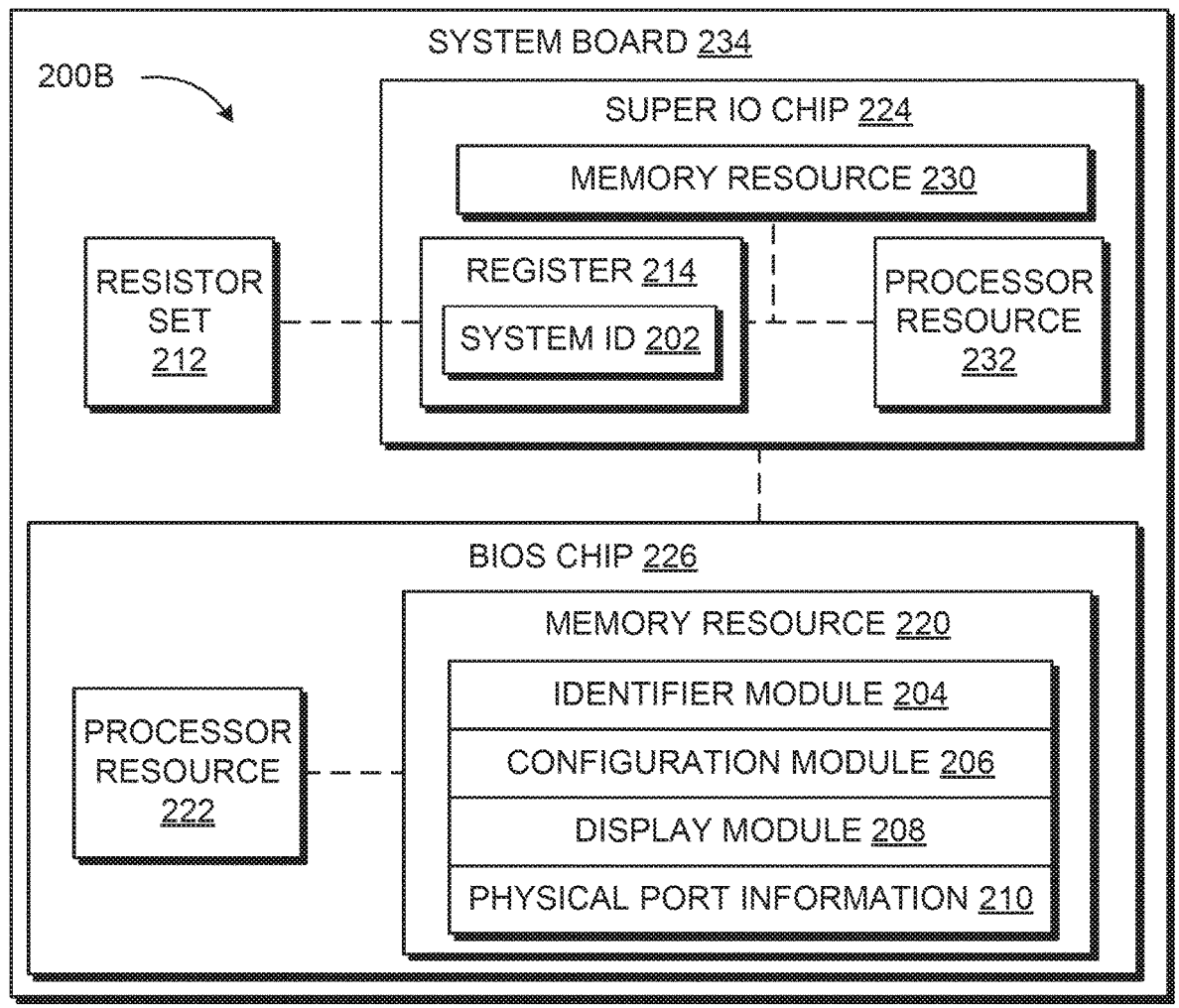

FIGS. 1, 2A, and 2B are block diagrams depicting example systems 100, 200A, and 200B for providing a representation of a physical location of a port. Referring to FIG. 1, the example system 100 of FIG. 1 generally includes an identifier engine 104, a configuration engine 106, and a display engine 108. In general, the configuration engine 106 uses a system identifier 102 provided by the identifier engine 104 to retrieve physical port information 110 that is caused to be displayed by the display engine 108. In this manner, a BIOS configured with an identifier engine 104, a configuration engine 106, and a display engine 108 as described herein may accurately retrieve a depiction of the physical location of ports of the system 100 using a system identifier (such as a hardware coded system identifier associated with the particular model of system board) and display the depiction with device information so that a user may, for example, quickly identify what device is connected to the system 100 and at what port location.

The identifier engine 104 represents any circuitry or combination of circuitry and executable instructions to retrieve a value stored on a first memory resource located on a system board. The value stored on the first memory resource may be any number, character, string, label, or other storable representation. For example, a system identifier that identifies a system configuration (e.g., a class or version of the system board and/or class or version of the chassis) may be the value placed in a processor register of a central processing unit (CPU) on a system board. Example memory resources are described further with regards to FIGS. 2A and 2B. An example memory resource may be a register (e.g., a processor register) located on a super input output (IO) chip where the value is placed into the super IO register at powering up of the system 100. For example, once power is provided to a system board having a set of resistors, a signal is produced based on the set of resistors and the signal is translated to a value placed into the register of the super IO. In this manner, a value (such as a system identifier) may, for example, be coded by hardware into the system board and thus, programmed into a super IO register to identify a specific class of system.

The configuration engine 106 represents any circuitry or combination of circuitry and executable instructions to identify a memory resource location on a second memory resource using a system identifier 102 associated with the value stored on the first memory resource. The memory resource location identified is to be the location of physical port information 110 associated with the system identifier 102. For example, the configuration engine 106 may part of or include a BIOS chip that determines the location on a memory resource of stored physical port information 110 that is associated with the value (e.g., a system identifier) retrievable by the identifier engine 104. For example, the system identifier 102 may be an alphanumeric value useable as a key for a lookup table with references to locations of images of a system board or chassis that are stored on a second memory resource. In that example, physical port information 110 may be identified by looking up the system identifier in a table of system configurations stored on the second memory resource of the system board and retrieving appropriate information in the fields of the table that are associated with the system identifier 102.

As used herein, physical port information, such as the physical port information 110, includes data useable to identify a physical location of a port of the system board, such as physical port information comprising an image representative of a plurality of universal serial bus (USB) ports coupled to the system board represented by the system identifier 102. Examples of physical port information include an external port image of the physical location of the port on a chassis image when the port is an external port; an internal port image of the physical location of the port on a system board image; a connection status representing whether a device is connected to the port; and a header information for the device connected to the system 100. As used herein, an image represents any graphical representation of an object, such as a digital representation of a photo, a drawing, an icon, a shape, a map, a logical block depiction, etc. or any combination thereof. For example, the objects depictable as described herein include ports, chassis, and system boards, and such depiction may include profile or perspective views of a chassis, a mechanical model drawing of a system board showing locations of internal USB ports, etc. As discussed herein, the images may be stored on a local memory resource, such as on a memory resource of a BIOS chip, or stored remotely for systems with network access capabilities.

As used herein, a table represents any data structure capable of mapping a system identifier 102 to physical port information 110 (e.g., location of physical port information), such as a data structure that contains data organizable in columns and rows. For example, a lookup table may comprise columns of data including a column for a BIOS version, a column for a product model number, a column for a form factor class, and a column for a system identifier 102. A lookup table may be accessed by providing a key (e.g. input data) to retrieve fields in the row of the key (e.g., output data). The table may be stored on a local memory resource, such as on a memory resource of a BIOS chip, or stored remotely for systems with network access capabilities.

The configuration engine 106 may comprise circuitry or circuitry and executable instructions to identify device information. For example, the configuration engine 106 may comprise a processor resource of a BIOS chip and BIOS program code, that when executed, causes the BIOS chip to detect a connection status for each of a plurality of USB ports and retrieve device information for each device connected to the plurality of USB ports. As used herein, a connection status is a state that represents whether a device is connected (e.g., physically connected) to a port. The connection status may be represented by a status identifier. Example device information, as discussed further herein, include header information, such as USB header information retrievable from a connected device.

The display engine 108 may display information obtained by the configuration engine 106. The display engine 108 represents any circuitry or combination of circuitry and executable instructions to cause the physical port information to be displayed. For example, the display engine 108 may represent a combination of circuitry and executable instructions that, when executed, cause physical port information to display on a monitor connected to the system, where the physical port information displayed identifies a physical location of each of the plurality of USB ports that have a device connected.

A status identifier associated with a connection status may be caused to be displayed by the display engine 108 for each of a plurality of USB ports of a system board. The status identifier represents any value, number, character, label, font, color, or other representation capable of depicting a connection status. For example, a status identifier may be a color and each image of a port may be indicated with a green color for ports with a device connected and indicated with a red color for ports without a device connected.

The display engine 108 may cause device information to be displayed on a user interface (UI) relative to a port on an image of physical USB port locations in response to a UI event. For example, USB header information of a device coupled to a first USB port of the plurality of USB ports may be caused to be displayed in response to a mouse-over event (e.g., a particular UI event) relative to a portion of the image representative of the first USB port.

The UI provided by the display engine 108 may allow for port operations to be performed. For example, the display engine 108 may enable selection of a port operation on a USB port via the image of USB ports in response to a determination that the USB port is populated (e.g., a device is physically connected to the USB port) and perform the port operation when it is selected (e.g., based on a UI event designated for selecting an option on the UI). Example port operations include enabling the port, disabling the port, enabling charging via the port, disabling charging via the port, modifying assignment of resources to a device on the port, ejecting safely to terminate a logical session with the device on connected to the port, or a combination thereof.

As some displays may have low resolutions or otherwise insufficient capabilities to appropriately display an image representing the physical port information, the physical port information may be provided as a textual representation. For example, the display engine 108 may identify extended display identification data (EDID) information of a display coupled to the system board and cause text to display in response to determination that a resolution threshold (e.g., a minimum resolution) is satisfied by the EDID information where the text describes the physical location of the port.

Figure 3:
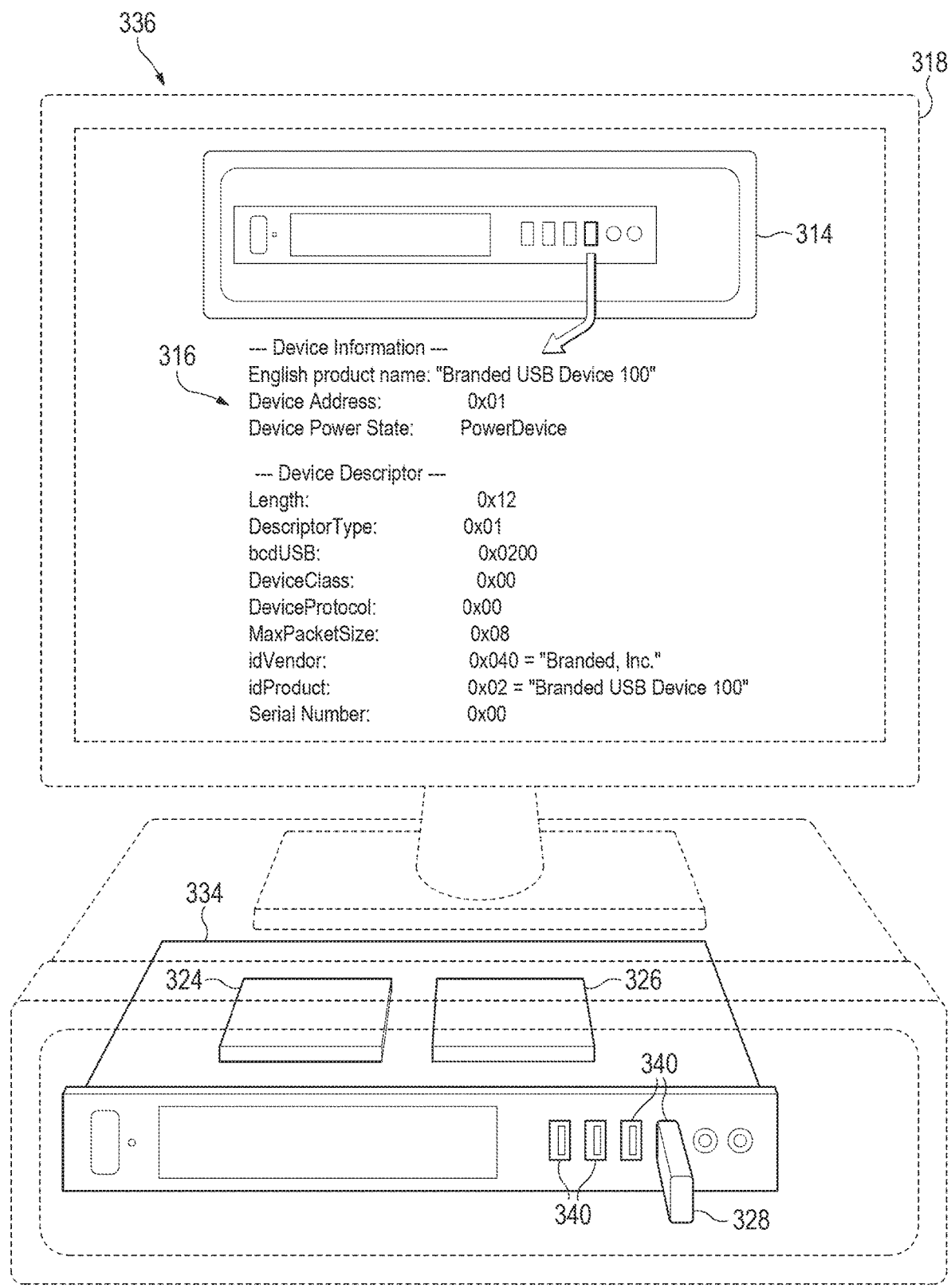
FIG. 3 is a perspective view of an example desktop system for providing a representation of a physical location of a port.
Figure 4:
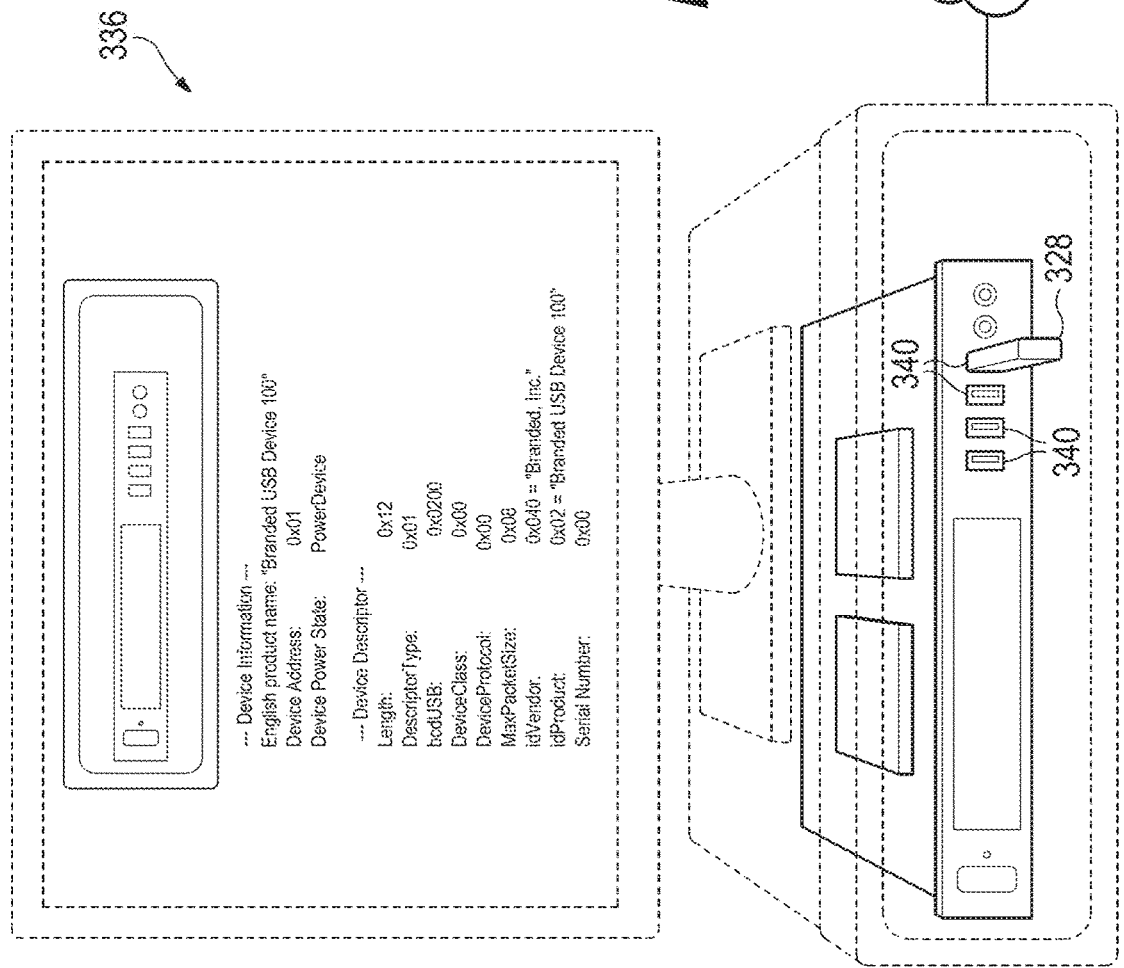
FIG. 4 depicts an example environment in which various example systems for providing a representation of a physical location of a port may be implemented.
Figure 5:
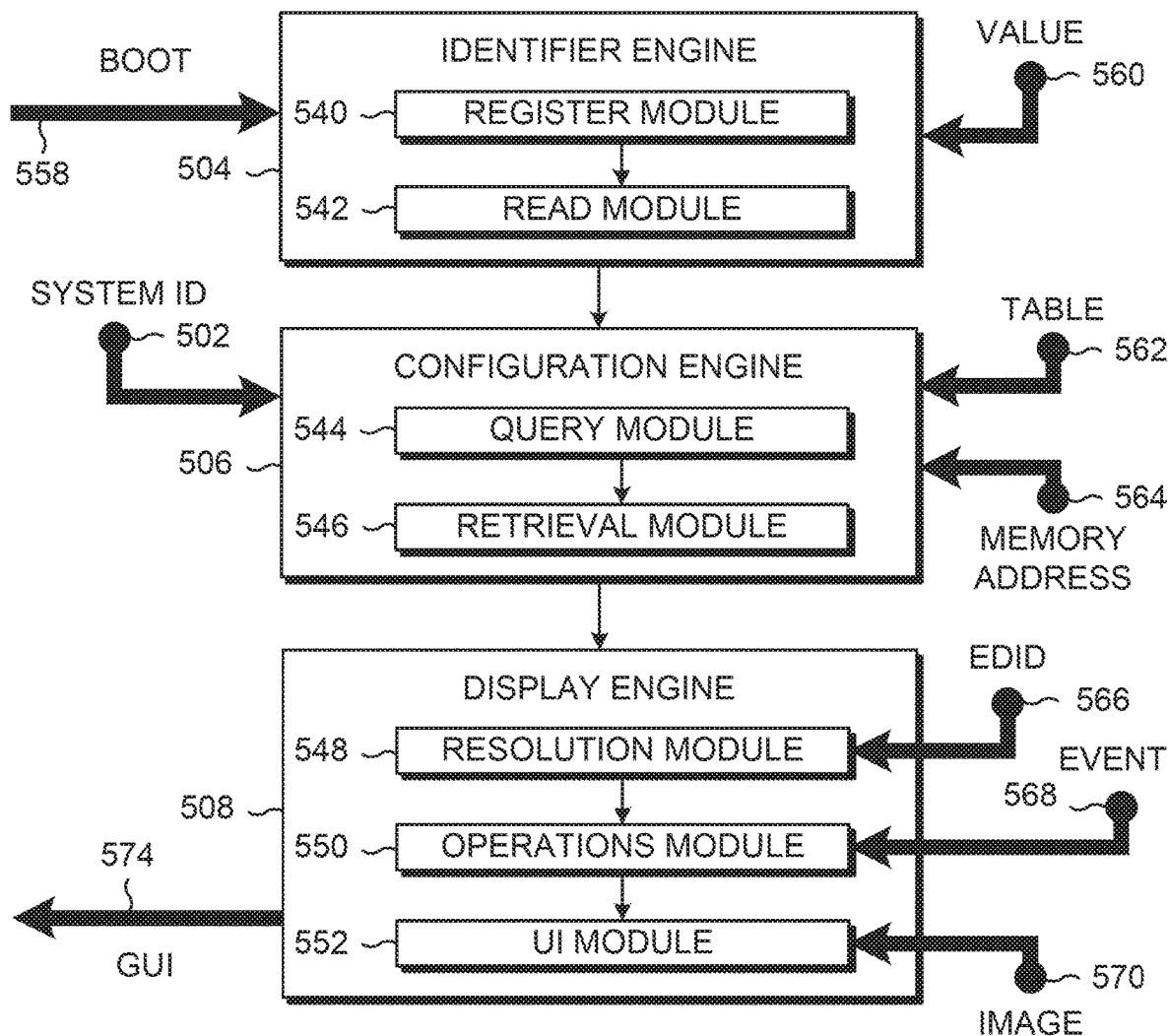
FIG. 5 depicts example operations used to implement example systems for providing a representation of a physical location of a port.
Figure 6:
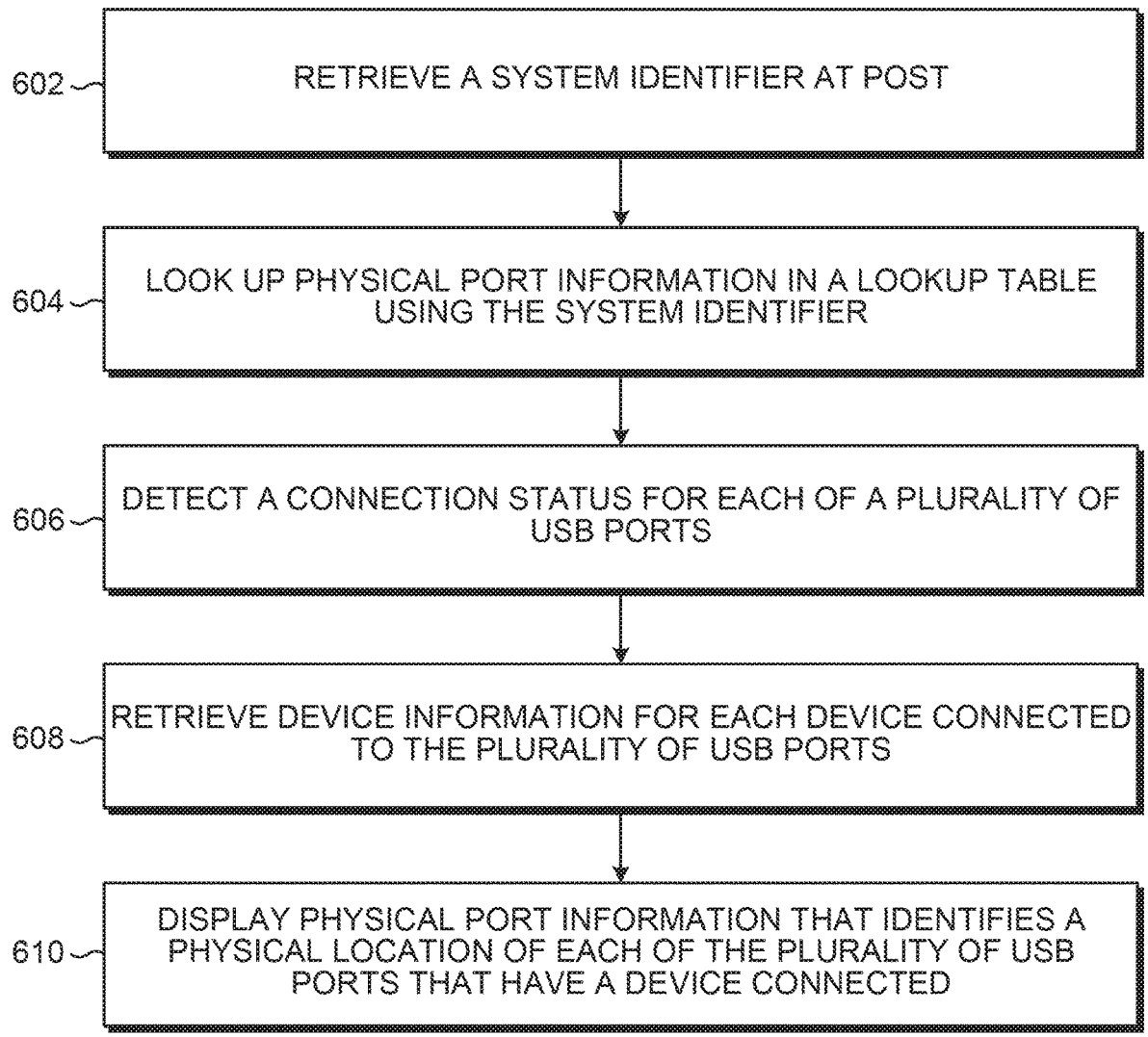
FIGS. 6 and 7 are flow diagrams depicting example processes for providing a representation of a physical location of a port.
Figure 7:
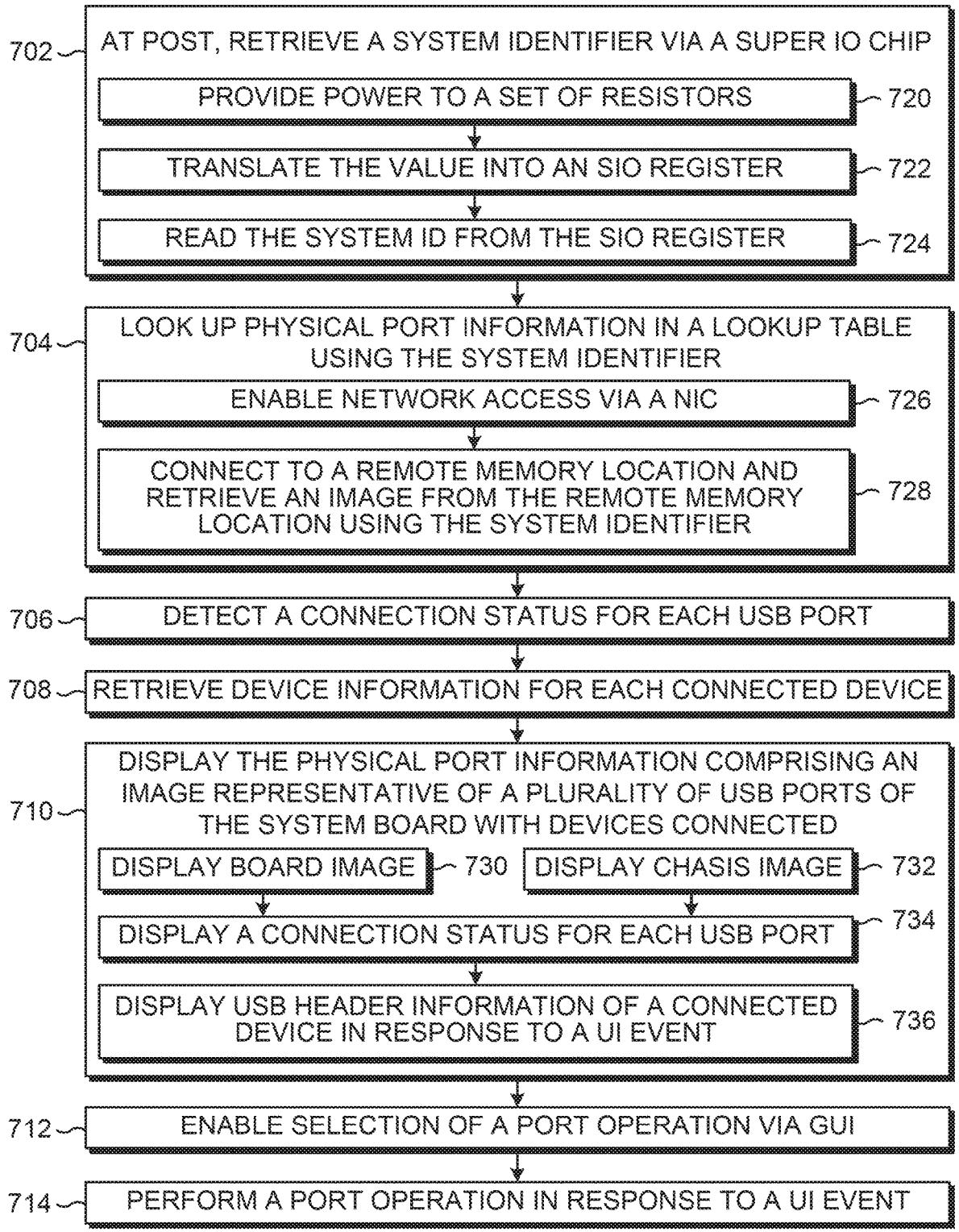

In some examples, functionalities described herein in relation to any of FIGS. 1-4 may be provided in combination with functionalities described herein in relation to any of FIGS. 5-7.

FIG. 2A depicts the example system 200A may comprise a memory resource 220 operatively coupled to a processor resource 222. Referring to FIG. 2A, the memory resource 220 may contain a set of instructions that are executable by the processor resource 222. The set of instructions are operable to cause the processor resource 222 to perform operations of the system 200 when the set of instructions are executed by the processor resource 222. The set of instructions stored on the memory resource 220 may be represented as an identifier module 204, a configuration module 206, and a display module 208. The identifier module 204, the configuration module 206, and the display module 208 represent program instructions that when executed function as the identifier engine 104, the configuration engine 106, and the display engine 108 of FIG. 1, respectively. For example, the configuration engine 106 of FIG. 1 may be a combination of circuitry and executable instructions on a BIOS chip that, when executed, cause a processor resource (e.g., processor resource 220) of the BIOS chip to retrieve a value (e.g., a system identifier) from a memory resource (e.g., memory resource 220) on a system board (e.g., a register on the super IO chip) and obtain physical port information associated with the system identifier of the register. The processor resource 222 may carry out a set of instructions to execute the modules 204, 206, 208, and/or any other appropriate operations among and/or associated with the modules of the system 200A. For example, the processor resource 222 may carry out a set of instructions to obtain an image of a plurality of ports associated with the system identifier and cause device information to be displayed relative to a port on the image in response to a UI event. For another example, the processor resource 222 may carry out a set of instructions from the memory resource 220 to perform the operations depicted in the example operations and/or processes discussed with regards to FIGS. 5, 6, and/or 7. The physical port information 210 may represent a set of a plurality of sets of physical port information, such as a set of physical port information for each family of devices produced by a particular source, and the correct set of physical port information is selectable using the system identifier, such as system identifier 202 as shown in FIG. 2B.

Although these particular modules and various other modules are illustrated and discussed in relation to FIG. 2A or 2B and other example implementations, other combinations or sub-combinations of modules may be included within other implementations. Said differently, although the modules illustrated in FIGS. 2A and 2B (and discussed in other example implementations) perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules. FIG. 5 depicts yet another example of how functionality may be organized into modules.

Referring to FIG. 2B, the system 200B may be implemented on a system board 234 comprising a resistor set 212, a super IO chip 224, and a BIOS chip 226. A chip, as used herein, is a combination of a processor resource, a memory resource, and executable instructions stored on the memory resource to perform a particular task or set of tasks. In the example of the super IO chip 224, the super IO chip 224 comprises a processor resource 232, a memory resource 230, and a register 214. The system identifier 202 is storable in the register 214 of the super IO chip 224. For example, upon providing power to the system board 234, a signal is produced using the resistor set 212 which places a value (in this example, the system identifier 202) into the register 214. In the example of the BIOS chip 226, the BIOS chip comprises a processor resource 222 and a memory resource 220 to execute BIOS code and operate the BIOS with capabilities of identifying a physical location of a port on the system board 234. For example, the memory resource 220 of the BIOS chip 226 includes an identifier module 204, a configuration module 206, a display module 208, and physical port information 210 stored thereon as indicated with reference to FIG. 2A. The BIOS chip 226 may perform operations entailed with the boot process as well as provide capability to view physical port information 210, as described herein, when indicated by the user. For example, the BIOS is executed by the BIOS chip 226 to perform a power-on self-test (POST) and detect all USB devices and graphically represent them on a picture of the chassis. For another example, the BIOS may be executed by the BIOS chip 226 to allow for moving a cursor over a populated USB port on a chassis picture to display device information taken from the USB header during initialization, thus indicating which device is connected to which physical location. For yet another example, the BIOS may be executed by the BIOS chip 226 to allow for a click by a mouse on a USB port representation to select the port for configuration and perform an operation specific to that port, such as disabling the port.

A processor resource, such as processor resource 222 or processor resource 232, is any appropriate circuitry capable of processing (e.g., computing) instructions, such as one or multiple processing elements capable of retrieving instructions from a memory resource, such as memory resource 220 or memory resource 230, and executing those instructions. For example, the processor resource 222 may be a CPU that enables providing a representation of a physical locations of a port by fetching, decoding, and executing modules 204, 206, and 208. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). The processor resource 222 may include multiple processing elements that are integrated in a single device or distributed across devices. A processor resource may process the instructions serially, concurrently, or in partial concurrence.

As used herein, a memory resource represents a medium to store data utilized and/or produced by the system. The medium is any non-transitory medium or combination of non-transitory media able to electronically store data, such as modules of the system 200A and/or data used by the system 200A. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. The memory resource 220 may be said to store program instructions that when executed by the processor resource 222 cause the processor resource 222 to implement functionality of the system 200A of FIG. 2A or system 200B of FIG. 2B. A memory resource may be integrated in the same device as a processor resource or it may be separate but accessible to that device and the processor resource. A memory resource may be distributed across devices. The memory resources 220 and 230 may represent the same physical medium or separate physical media. The data of the system, such as a system identifier 202 and physical port information 210, may be stored on a memory resource.

In the discussion herein, the engines 104, 106, and 108 of FIG. 1 and the modules 204, 206, and 208 of FIGS. 2A and 2B have been described as circuitry or a combination of circuitry and executable instructions. Such components may be implemented in a number of fashions. Looking at FIG. 2A, the executable instructions may be processor-executable instructions, such as program instructions, stored on the memory resource 220, which is a tangible, non-transitory computer-readable storage medium, and the circuitry may be electronic circuitry, such as processor resource 222, for executing those instructions. The instructions residing on the memory resource 220 may comprise any set of instructions to be executed directly (such as machine code) or indirectly (such as a script) by the processor resource 222.

In some examples, the systems 200A may include the executable instructions may be part of an installation package that when installed may be executed by the processor resource 222 to perform operations of the system 200A, such as methods described with regards to FIGS. 5-7. In that example, the memory resource 220 may be a portable medium such as a compact disc, a digital video disc, a flash drive, or memory maintained by a computer device, such as a device 336 of FIG. 3, from which the installation package may be downloaded and installed. In another example, the executable instructions may be part of an application or applications already installed. The memory resource 220 may be a non-volatile memory resource such as read only memory (ROM), a volatile memory resource such as random access memory (RAM), a storage device, or a combination thereof. Example forms of a memory resource 220 include static RAM (SRAM), dynamic RAM (DRAM), electrically erasable programmable ROM (EEPROM), flash memory, or the like. The memory resource 220 may include integrated memory such as a hard drive (HD), a solid state drive (SSD), or an optical drive. The memory resource may be integrated with a processor resource, such as a processor register.

FIGS. 3 and 4 depict example environments in which various example systems for providing a representation of a physical location of a port may be implemented. The example of FIG. 3 is an integrated system on a compute device 336 having the disclosed BIOS chip 326 and the super IO chip 324 on the system board 334 and ports 340 with a peripheral device 328 connected to one of the ports 340. The monitor 318 of the compute device 336 may display a UI that shows a depiction 314 of the physical location of the port and device information 316 associated with the connected device 328 relative to the port on which the peripheral device 328 is connected. The example compute device 336 of FIG. 3 is a desktop computer. Other example compute devices that may utilize the systems described herein are notebook devices, server devices, tablet devices, mobile phones, etc.

The example of FIG. 4 is a distributed system where the physical port information 310 is located on a remote database 344. Referring to FIG. 4, the compute device 336 may communicate with another compute device to obtain the physical port information 310. For example, the compute device 336 may connect to a remote compute device having a data store 344 via a link 338 and receive the physical port information 310 from the remote compute device. The information received may include the system board information, device information, and/or information associated with the connection of the peripheral device 328 at a port of the compute device 336.

For example, the port information may be located on a server device that represents generally any compute devices to respond to a network request received from a user device, such as compute device 336. For example, the server device may operate a combination of circuitry and executable instructions to provide a network packet in response to a request for a page or functionality of an application. In that example, the compute device 336 represents generally any compute devices to communicate a network request and receive and/or process the corresponding responses. For example, a browser application may be installed on the user device 336 to receive the network packet from the server device and utilize the payload of the packet to display an element of a page via the browser application.

A link 338 generally represents one or a combination of a cable, wireless connection, fiber optic connection, or remote connections via a telecommunications link, an infrared link, a radio frequency link, or any other connectors of systems that provide electronic communication. The link 338 may include, at least in part, intranet, the Internet, or a combination of both. The link 338 may also include intermediate proxies, routers, switches, load balancers, and the like.

The compute devices may be located on separate networks 330 or part of the same network 330. The example environment may include any appropriate number of networks 330 and any number of the networks 330 may include a cloud compute environment. A cloud compute environment may include a virtual shared pool of compute resources. For example, networks 330 may be distributed networks comprising virtual computing resources.

The data store 344 may contain information utilized by the engines of the system, such as engines 104, 106, and 108 of FIG. 1. For example, the data store 344 may store physical port information 310, such as an image or text representing the location of a port. Other example data storable remotely are a connection status, device information, and a list of port operations.

FIG. 5 depicts example modules used to implement example systems for providing a representation of a physical location of a port. Referring to FIG. 5, the example engines of generally include an identifier engine 504, a configuration engine 506, and a display engine 508 that are similar to engines 104, 106, and 108 of FIG. 1, respectively, and the associated descriptions are not repeated in their entirety.

At boot 558, the identifier engine 504 retrieves a value 560. The identifier engine 504 may comprise program instructions, such as register module 540 and read module 542, to facilitate retrieval of the system identifier that identifies the particular system configuration. The register module 540 represents program instructions that when executed by a processor resource cause the processor resource to identify the register where the value 560 is located and the read module 542 represents program instructions that when executed by a processor resource cause the processor resource to read the value 560 located in the register identified by executing the register module 540.

The value 560 stored on the register is associated with (e.g., maps to) or is equal to the system identifier 502 depending on the implementation. The configuration engine 506 utilizes the system identifier 502 with a table 562 to identify a memory address 564 where physical port information associated with the particular system configuration is located. The configuration engine 506 may include program instructions, such as query module 544 and retrieval module 546, to facilitate obtaining a memory location with the physical port information. The query module 544 represents program instructions that when executed by a processor resource cause the processor resource to perform a lookup in the table 562 using the system identifier 502 as a key and, in response to the lookup, a memory address 564 of physical port information is retrieved. The retrieval module 546 represents program instructions that when executed by a processor resource cause the processor resource to retrieve the data located at the memory address 564. For example, the table 562 may provide a pointer reference or a uniform resource locator (URL) to a memory location containing an image 570 and the retrieval module 546 is executed to obtain the image 570 from the memory address 564.

The display engine 508 may include program instructions, such as a resolution module 548, an operations module 550, and a UI module 552, that are executable to facilitate the display of the physical location of the ports of the system and any connected device information. The resolution module 548 represents program instructions that when executed cause a processor resource to retrieve EDID 566 of a connected display and identify whether an image representing a physical location of a port or text representing a physical location of a port is to be displayed. The operations module 550 represents program instructions that when executed by a processor resource cause the processor resource to enable, display, and/or perform a port operation in accordance with UI events associated with those operations. The UI module 552 represents program instructions that when executed by a processor resource cause the processor resource to display the physical port information, such as the image 570 when the EDID 566 includes a resolution above a minimum resolution threshold, that indicates the physical location of the ports, in particular ports with devices connected. The display engine 508 may prepare and/or otherwise cause a graphical user interface (GUI) 574 to display with the physical port information.

FIGS. 6 and 7 are flow diagrams depicting example processes for providing a representation of a physical location of a port. Referring to FIG. 6, example processes for providing a representation of a physical location of a port may generally comprise retrieving a system identifier, looking up physical port information using a system identifier, detecting a connection status for ports, retrieving device information for connected devices, and causing the physical port information that identifies the physical location of each connected device to display. The processes are performable by identifier engines, configuration engines, and display engines (such as engine 104, 106, and 108 of FIG. 1) as described herein.

At block 602, a system identifier is retrieved from a memory resource on a system board during a POST. The system identifier is hardware coded into the system board, such as through a set of resistors coupled to a register that loads the system identifier in the register at power up. For example, referring to FIG. 1, a register of a super IO chip may contain the value based on the system board configuration and the identifier engine 104 of FIG. 1 may perform the identifier retrieval from the register at block 602. At block 604, physical port information is looked up in a lookup table using the system identifier retrieved at block 602. For example, referring to FIG. 1, the configuration engine 106 may perform a lookup operation of block 604 based on the system identifier retrieved by identifier engine 104.

At block 606, a connection status is detected for each of the plurality of USB ports. The connect status for each port may be displayed by a GUI to indicate possible locations of a connected device. At block 608, device information for each device connected to the plurality of USB ports is retrieved. In this manner, the device information is available to provide to a user by displaying the information upon retrieval or in response to a UI event, such as a hover-over event on a port image (i.e., a visual representation of a port) displayed on the GUI. For example, referring to FIG. 1, the configuration engine 106 may perform the connection status detection at block 606 and the device information retrieval at block 608. At block 610, the physical port information that identifies a physical location of each of the plurality of USB ports that have a device connected is displayed. For example, referring to FIG. 1, the display engine 108 may cause the physical port information obtained by the configuration engine 106 to display on a compute device. In this manner, the processes of FIG. 6 provide information useable by a user to find a physical location of the port to which a device is connected.

FIG. 7 includes blocks similar to blocks of FIG. 6 and provides additional blocks and details. In particular, FIG. 7 depicts additional blocks and details generally regarding retrieving a value readable from a set of resistors, retrieving physical port information from a remote memory location, displaying particular portions of physical port information, and enabling port operations. Blocks 702, 704, 706, 708, and 710 are similar to blocks 602, 604, 606, 608, and 610 of FIG. 6 and, for brevity, their respective descriptions are not repeated.

At block 720, power is provided to a set of resistors to produce a signal. At block 722, the signal is translated to a system identifier placed into a register on the super IO chip. For example, referring to FIG. 2A, a signal travels from a set of resistors 212 to a register 214 upon powering the system board 234. At block 724, the system identifier is read from the super IO register. For example, referring to FIG. 2A, the BIOS chip 226 may perform the operations at block 724 by accessing the data in the register 214 of the super IO chip 224. In this manner, the system identifier is available to describe the system configuration during the boot process, which includes POST.

At block 726, network access of a system is enabled via a network interface card (NIC) coupled to the system board. For example, the BIOS may allocate resources to utilize the NIC to connect to a predetermined location, such as a remote memory location identifiable based on a URL stored on a memory resource on the system board. At block 728, a connection is established to a remote memory location via the NIC and an image of the system configuration is retrieved from the remote memory location using the system identifier. For example, referring to FIGS. 3 and 4, the BIOS chip 326 may perform the operations of blocks 726 and 728 by allocating resources to the NIC of compute device 336 to enable use of the NIC, retrieving a predetermined URL in a memory resource of the BIOS chip 326, sending a connection request to a remote device at the URL to establish a connection with the remote device over link 338, requesting physical port information 310 (e.g., the image that identifies physical port information associated with the system identifier) be sent from the remote database 344 using the system identifier, and receiving the physical port information 310 via the NIC of the compute device 336.

At block 710, an image of the chassis and/or an image of the system board are identified to display. At block 730, a chassis image is displayed in response to a determination that a USB port of the plurality of USB ports is an external USB port. The chassis image may include an external port image of the physical location of the port on a chassis image when the port is an external port. At block 732, a system board image is displayed in response to a determination that a USB port is an internal USB port. The system board image may include an internal port image of the physical location of the port on a system board image when the port is an internal port. For example, referring to FIG. 1, the display engine 108 may perform the operations at blocks 730 and 732 by identifying the type(s) of USB ports of the system configuration (e.g., determining whether the system configuration has internal USB ports and/or external USB ports), selecting whether to show a chassis image or a system board image (or both) based on the types of USB ports of the system configuration; and causing a UI to display the chassis image and/or the system board image based on the selection.

At block 734, a connection status is displayed for each of the plurality of USB ports with the connection status(es) detected at block 706. At block 736, the USB header information (retrieved at block 708) of a device connected to a first USB port of the plurality of USB ports is displayed in response to a UI event relative to a portion of the image associated with the first USB port. For example, referring to FIG. 1, the display engine 108 may perform the operations of blocks 734 and 736.

At block 712, selection of a port operation is enabled via the GUI. For example, port operation capabilities may be identified and presented as a list when hovering over the port image (e.g., the portion of the chassis image or system board image that depicts the physical location of the port). At block 714, the port operation is performed in response to a determination that a UI event occurs that represents the selection of the port operation, such as selection of an item in a list of port operations displayed on the GUI. For example, referring to FIG. 1, the operations of blocks 712 and 714 may be performed by the display engine 108. By utilizing the processes described with regards to FIGS. 6 and 7, a physical location of a port is identified using a representation and additional information may be provided along with the physical port information, for example.

Although the flow diagrams of FIGS. 5-7 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

All of the features disclosed in this specification (including any accompanying claims, abstract and drawings), and/or all of the elements of any method or process so disclosed, may be combined in any combination, except combinations where at least some of such features and/or elements are mutually exclusive.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A system comprising:
    an identifier engine to retrieve a value stored on a first memory resource located on a system board;
    a configuration engine to identify, using a system identifier associated with the value, a memory resource location on a second memory resource that is to store physical port information, the physical port information comprising data useable to identify a physical location of a port of the system board; and
    a display engine to cause the physical port information to be displayed.

2. The system of claim 1, wherein the configuration engine is further to:
    look up the system identifier in a table of system configurations stored on the second memory resource of the system board, wherein the system identifier is an alphanumeric value.

3. The system of claim 1, wherein
    the first memory resource is a register of a super input output (IO) chip;
    the value stored on the register is the system identifier; and
    the configuration engine comprises a basic input output system (BIOS) chip.

4. The system of claim 1, wherein the physical port information further comprises one of:
    an external port image of the physical location of the port on a chassis image when the port is external port;
    an internal port image of the physical location of the port on a system board image when the port is an internal port;
    a connection status representing whether a device is connected to the port; or
    header information for the device in response to a user interface (UI) event.

5. The system of claim 1, wherein the display engine is further to:
    enable selection of a port operation, the port operation is enabling the port, disabling the port, enabling charging via the port, disabling charging via the port, modifying assignment of resources to a device on the port, ejecting safely to terminate a logical session with the device on connected to the port, or a combination thereof.

6. The system of claim 1, wherein the configuration engine is further to:
    connect to a compute device via a link; and
    receive the physical port information from the compute device.

7. A system board comprising:
    a set of resistors;
    a super input output (IO) chip comprising:
        a register to comprise a system identifier associated with the set of resistors when power is applied to the system board; and
    a basic input output system (BIOS) chip comprising:
        a processor resource,
        a memory resource comprising a set of instructions that when executed by the processor resource causes the BIOS chip to:
            obtain physical port information associated with the system identifier of the register, the physical port information comprising an image; and
            cause device information to be displayed relative to a port on the image in response to a user interface (UI) event.

8. The system board of claim 7, wherein the set of instructions is further executable by the processor resource to:
    cause a status identifier associated with a connection status to display for each of a plurality of universal serial bus (USB) ports of the system board;
    cause header information of a device coupled to a first USB port of the plurality of USB ports to display, wherein the UI event is a mouse-over event relative to a portion of the image representative of the first USB port; and
    enable selection of a port operation on the first USB port via the image in response to a determination that the first USB port is populated.

9. The system board of claim 7, wherein the set of instructions is further executable by the processor resource to:
    identify extended display identification data (ED ID) information of a display coupled to the system board; and
    cause text information to display in response to determination that a resolution threshold is satisfied by the END information.

10. A non-transitory computer-readable storage medium comprising a set of instructions executable by a processor resource to:
    retrieve, during a power on self-test (POST), a system identifier from a memory resource on a system board;

look up physical port information in a lookup table using the system identifier, the physical port information comprising an image representative of a plurality of universal serial bus (USB) ports coupled to the system board represented by the system identifier;

detect a connection status for each of the plurality of USB ports, the connection status to represent whether a device is connected;

retrieve device information for each device connected to the plurality of USB ports; and display the physical port information that identifies a physical location of each of the plurality of USB ports that have a device connected.

11. The medium of claim 10, wherein the set of instructions is executable by the processor resource to:

provide power to a set of resistors to produce a signal; and translate the signal to a system identifier placed into a register, wherein the memory resource is the register.

12. The medium of claim 10, wherein the set of instructions is executable by the processor resource to:

display a chassis image in response to a determination that a first USB port of the plurality of USB ports is an external USB port; wherein the image comprises the chassis image; and display a system board image in response to a determination that the first USB port is an internal USB port, wherein the image comprises the system board image.

13. The medium of claim 10, wherein the set of instructions is executable by the processor resource to:

display the connection status for each of the plurality of USB ports; and display USB header information of a device connected to a first USB port of the plurality of USB ports in response to a user interface (UI) event relative to a portion of the image associated with the first USB port.

14. The medium of claim 10, wherein the set of instructions is executable by the processor resource to:

enable selection of a port operation via a graphical user interface (GUI); and perform the port operation in response to a determination that user interface (UI) event occurs that represents the selection of the port operation.

15. The medium of claim 10, wherein the set of instructions is executable by the processor resource to:

enable network access of a system via a network interface card (NIC) coupled to the system board;

connect, via the MC, to a remote memory location, the remote memory location identified based on a universal resource locator (URL) stored on the memory resource; and retrieve the image from the remote memory location using the system identifier.

16. The system of claim 1, the display engine to display an image showing the physical location of the port relative to other components of the system.

17. The system of claim 16, the display engine to indicate on the displayed image whether a device is connected to the port.

18. The system of claim 16, the display engine to enable selection of a port operation of the port in response to selection of the port on the displayed image with a user input device.

19. The system of claim 17, the display engine to display information about a device connected to the port in response to indication of the port on the displayed image with a user input device.

20. The system of claim 16, wherein the image depicts a chassis of the system and the location of the physical port on the chassis.

* * * * *